US008133829B2

(12) United States Patent
Ide

(10) Patent No.: US 8,133,829 B2
(45) Date of Patent: Mar. 13, 2012

(54) FRIT

(75) Inventor: Asahi Ide, Chiyoda-ku (JP)

(73) Assignee: Asahi Glass Company, Limited, Tokyo (JP)

(*) Notice: Subject to any disclaimer, the term of this patent is extended or adjusted under 35 U.S.C. 154(b) by 284 days.

(21) Appl. No.: 12/412,961

(22) Filed: Mar. 27, 2009

(65) Prior Publication Data

US 2009/0247385 A1 Oct. 1, 2009

(30) Foreign Application Priority Data

Mar. 28, 2008 (JP) ................. 2008-087962
Feb. 2, 2009 (JP) ................. 2009-021565

(51) Int. Cl.
*C03C 8/14* (2006.01)
*C03C 8/20* (2006.01)
*C03C 8/02* (2006.01)
*C03C 8/08* (2006.01)
*C03C 8/04* (2006.01)

(52) U.S. Cl. ............. 501/17; 501/18; 501/21; 501/24; 501/26

(58) Field of Classification Search ............ 501/14, 501/15, 17, 18, 21, 24, 26
See application file for complete search history.

(56) References Cited

U.S. PATENT DOCUMENTS

| | | | | |
|---|---|---|---|---|
| 6,048,811 | A * | 4/2000 | Morena ............... | 501/15 |
| 6,555,025 | B1 | 4/2003 | Krupetsky et al. | |
| 7,439,201 | B2 * | 10/2008 | Drake et al. ............ | 501/15 |
| 2002/0128141 | A1 * | 9/2002 | Buhrmaster et al. ...... | 501/45 |
| 2004/0207314 | A1 | 10/2004 | Aitken et al. | |
| 2006/0105898 | A1 * | 5/2006 | Ide ..................... | 501/50 |
| 2007/0128966 | A1 | 6/2007 | Becken et al. | |

FOREIGN PATENT DOCUMENTS

| | | |
|---|---|---|
| JP | 9-110467 | 4/1997 |
| JP | 2002-164165 | 6/2002 |
| JP | 2003-146691 | 5/2003 |
| JP | 2003-522089 | 7/2003 |
| JP | 2003-238199 | 8/2003 |
| JP | 2004-059367 A * | 2/2004 |
| JP | 2005-191516 | 7/2005 |
| JP | 2006-137637 | 6/2006 |
| JP | 2006-524419 | 10/2006 |
| JP | 2006-327845 | 12/2006 |
| JP | 2007-31258 | 2/2007 |
| JP | 2008-30972 | 2/2008 |
| JP | 2008-59802 | 3/2008 |
| JP | 2008-115057 | 5/2008 |
| JP | 2008-166197 | 7/2008 |
| JP | 2008-524872 | 7/2008 |
| JP | 2008-186697 | 8/2008 |

* cited by examiner

*Primary Examiner* — Jerry Lorengo
*Assistant Examiner* — Noah Wiese
(74) *Attorney, Agent, or Firm* — Oblon, Spivak, McClelland, Maier & Neustadt, L.L.P.

(57) ABSTRACT

The present invention provides a frit containing substantially no lead, which is applicable to a member having α of at most $50 \times 10^{-7}$/° C.

A frit comprising a low-melting point glass powder and a refractory filler powder, containing substantially no lead, having a thermal expansion coefficient of at most $50 \times 10^{-7}$/° C., and being processable at 500° C. or lower, wherein the above low-melting point glass powder satisfies a softening pour point range of at least 30° C., and the above refractory filler powder satisfies the following relationship:

$1 < S \times \rho < 10$

S: specific surface area (m$^2$/g)
ρ: density (g/cm$^3$).

6 Claims, No Drawings

FRIT

BACKGROUND OF THE INVENTION

1. Field of the Invention

The present invention relates to a frit containing substantially no lead, having a thermal expansion coefficient (hereinafter, referred to as "α") of at most $50 \times 10^{-7}/°$ C., and being processable at 500° C. or lower. The unit "%" used in the specification represents "mol %".

2. Discussion of Background

Heretofore, as a frit to be used for materials such as kovar, alkali-free glass and silicon having α of at most $50 \times 10^{-7}/°$ C., a glass powder containing $SiO_2$—$B_2O_3$ as a main component is used as disclosed in JP-A-09-110467. However, since the processing temperature of such glass exceeded 500° C., there were problems that other parts such as electrodes were damaged at the time of firing, and the thermal energy cost was high.

Further, in a case where only sealing is intended, e.g. JP-A-2005-191516 discloses a method of using a solder made of an Au—Sn alloy However, there were cost problems at the time of sealing a wide range since such an alloy was expensive in material cost as compared with a frit, and further there was a problem that the solder could not be used as a material for electrical insulation.

Further, JP-A-2002-164165 discloses a sealing method in which an organic material containing an epoxy resin as a main component is used. However, there was a problem that the resin was insufficient in air tightness in atmospheric air since e.g. moisture or carbon dioxide gas in an atmospheric air readily permeated the resin, and the reliability of the device tended to be lower than the case of using a frit.

In order to solve such problems, it has been desired to develop a frit having high electrical insulation characteristics and air tightness in atmospheric air, containing no lead, and being processable at a temperature of 500° C. or lower.

Patent Document 1: JP-A-09-110467
Patent Document 2: JP-A-2005-191516
Patent Document 3: JP-A-2002-164165
Patent Document 4; JP-A-2003-146691

SUMMARY OF THE INVENTION

As disclosed in e.g. JP-A-2003-146691, a recently developed frit containing no lead and being processable at a temperature of 500° C. or lower, may be one having a refractory filler powder blended to a low-melting point glass having α of higher than $100 \times 10^{-7}/°$ C. for the purpose of lowering α, which is used for a material having α of from 65 to $85 \times 10^{-7}/°$ C. such as a soda lime glass or alumina. However, if it was attempted to adjust α to $50 \times 10^{-7}/°$ C., a larger amount of a refractory filler powder was required, and by the influence thereof, there was a problem that the fluidity during heating was too poor to carry out sealing at a temperature of 500° C. or lower.

Accordingly, it is an object of the present invention to provide a frit containing substantially no lead and being applicable to a member having α of at most $50 \times 10^{-7}/°$ C.

In the present invention, by taking the above problems into consideration, a low-melting point glass, and a sealing material obtained by adding a refractory filler powder to the low-melting point glass, were prepared and evaluated. As a result, it was found that the fluidity at the time of sealing a frit or forming a protective film varies depending upon the specific surface area, the specific gravity and the particle diameter of a refractory filler powder to be used. Further, a close investigation was conducted, and as a result, it was found that the difference in such properties is attributable to the surface area per unit volume of a filler powder particle.

Further, as the low-melting point glass, it was extremely useful to employ one having SnO and $P_2O_5$ as main components, as disclosed in JP-A-2003-146691. However, the tin (II) oxide as a main raw material was usually obtained in such a manner that a metal tin was dissolved in an inorganic acid such as HCl, and then SnO was precipitated by an inorganic alkali solution containing an alkali metal such as NaOH or an alkaline earth metal such as $Ca(OH)_2$. Thus, in the raw material, an alkali metal component or an alkaline earth metal component was contained in high concentration, and therefore such an impurity was found to be relevant to the adhesion strength with a material obtained after firing of a frit.

Accordingly, in order to solve the above problems, the invention corresponding to Claim 1 of the present invention is directed to a frit comprising a low-melting point glass powder and a refractory filler powder, containing substantially no lead, having a thermal expansion coefficient of at most $50 \times 10^{-7}/°$ C., and being processable at 500° C. or lower, wherein the above low-melting point glass powder satisfies a softening pour point range of at least 30° C., and the above refractory filler power satisfies the following relationship:

$$1 < S \times \rho < 10$$

S: specific surface area ($m^2/g$)
ρ: density ($g/cm^3$)

Here, the expression "processable at 500° C. or lower" includes not only a case where a frit is used for bonding or for a protective film or a rib by entire heating in e.g. a furnace, but also a case where a frit is used for local heating of only a part for forming a frit, by laser or infrared rays. Further, "a softening pour point range" is a temperature range of from the softening point to the crystallization initiation temperature of a low-melting point glass powder. Here, the softening point to be used is the third inflection point counted from the glass transition point by a differential thermobalance, and the crystallization initiation temperature is the fifth inflection point counted from the glass transition point by the differential thermobalance. Namely, (softening pour point range)=(crystallization initiation temperature)−(softening point).

The invention corresponding to Claim 2 is the invention according to Claim 1, wherein the above refractory filler powder is at least one member selected from the group consisting of silica, cordierite and zirconium phosphate type oxides (zirconium phosphate, zirconium tungstate phosphate, zirconium niobate phosphate, zirconium tantalate phosphate and a composite oxide as a combination thereof).

The invention corresponding to Claim 3 is the invention according to Claim 1 or 2, wherein the above low-melting point glass powder contains a low-melting point glass (tin phosphate type glass) containing, by "mol %" as calculated as oxides, from 20 to 68% of SnO, from 0.5 to 5% of $SnO_2$ and from 20 to 40% of $P_2O_5$, and by an outer percentage, less than 0.5 mass % in total of $R_2O$ (R is Li, Na or K) and R'O (R' is Ca, Sr or Ba) (hereinafter referred to as "total amount of $R_2O$ and R'O), when the mass of the low-melting point glass is regarded as 100 mass %.

The invention corresponding to Claim 4 is the invention according to any one of Claims 1 to 3, wherein the refractory filler powder is contained in an amount of from 35 to 55 vol %, and the low-melting point glass powder is contained in an amount of from 45 to 65 vol %.

The invention corresponding to Claim 5 is a paste comprising the frit as defined in the invention corresponding to any one of Claims 1 to 4 and a vehicle mixed therewith.

The invention corresponding to Claim 6 is the frit of the invention according to Claim 1, which further contains a heat absorbent powder. Thus, by adding the heat absorbent powder to the frit, it is possible to heat the frit by efficiently absorbing thermal energy when the frit is heated by local heating using an electromagnetic wave such as laser or infrared rays.

The invention corresponding to Claim 7 is the frit according to the invention corresponding to Claim 6, wherein the above low-melting point glass powder is made of a low-melting point glass (tin phosphate type glass) containing, by "mol %" as calculated as oxides, from 20 to 68% of SnO, from 0.5 to 5% of $SnO_2$ and from 20 to 40% of $P_2O_5$, or a low-melting point glass (bismuth type glass) containing from 30 to 50% of $Bi_2O_3$, from 15 to 25% of $B_2O_3$ and from 25 to 35% of ZnO.

The above tin phosphate type glass may contain e.g. $SiO_2$, ZnO, $Al_2O_3$, $WO_3$, $MoO_3$, $Nb_2O_5$, $TiO_2$, ZrO, CuO or $MnO_2$ as a component for stabilizing the glass, in addition to the above three components.

The invention corresponding to Claim 8 is the frit according to the invention corresponding to Claim 6 or 7, wherein the above refractory filler powder is at least one member selected from the group consisting of silica, cordierite and zirconium phosphate type oxides (zirconium phosphate, zirconium tungstate phosphate, zirconium niobate phosphate, zirconium tantalate phosphate and a composite oxide as a combination thereof).

The invention corresponding to Claim 9 is the frit according to the invention corresponding to any one of Claims 6 to 8, wherein the heat absorbent powder is made of at least one metal selected from Fe, Cr, Mn, Co, Ni and Cu or a compound containing the above metal.

The invention corresponding to Claim 10 is the frit according to the invention corresponding to any one of Claims 6 to 9, wherein the low-melting point glass powder is contained in an amount of from 45 to 65 vol %, the refractory filler powder is contained in an amount of from 30 to 50 vol % and the heat absorbent powder is contained in an amount of from 1 to 10 vol %.

The invention corresponding to Claim 11 is a paste, which comprises the frit as defined in the invention corresponding to any one of Claims 6 to 10, and a vehicle mixed therewith.

Now, the reason for limitation as defined above will be described. The refractory filler powder to be used in the present invention is required to satisfy the relationship of $1<S\times\rho<10$ (wherein S: specific surface area ($m^2/g$), and $\rho$: density ($g/cm^3$)).

Heretofore, a refractory filler to be used for a frit was used in such a manner that its maximum particle size was adjusted to be at most the desired thickness of a sealing layer, a protective film layer or a rib layer, and further such a filler was blended to a low-melting point glass so as to have a desired thermal expansion coefficient within a range not to impair the fluidity at the time of heating. However, such a refractory filler powder had many defects on the surface of the particles due to insufficiency of sintering under the synthesis conditions, or e.g. cracks or recesses resulting from crystalline phase transition, and to such a portion, the low-melting point glass powder tended to permeate or adsorb thereby to lead to the deterioration of the fluidity. Accordingly, it was necessary to use a refractory filler powder having less defects on the surface in order to permit sufficient flow at a temperature of at most 500° C., while a was kept to be at most $50\times10^{-7}/°$ C.

Here, the surface area of particles per constant mass represented by a BET method, namely the specific surface area is considered to be an index for the surface defects. However, a refractory filler powder is different in the density of filler particles, depending upon the difference in porosity of the interior of the particles due to synthesis conditions. Accordingly, there was a problem that even when the refractory filler powder has the same specific surface area, it is impossible to control the flow resistance due to the difference in the contact area between the low-melting point glass powder and the refractory filler powder. Accordingly, by controlling the surface area per unit volume of the refractory filler powder, namely $S\times\rho$ to a specific range, it is possible to keep the area of the interface between the low-melting point glass powder and the refractory filler powder, to a desired range, and it is thereby possible to maintain high flowability at 500° C. or lower even when an α is at most $50\times10^{-7}/°$ C.

According to the result of the experiment conducted by the present inventors, $1<S\times\rho<10$ is preferred. If $S\times\rho$ is at least 10, the interface area between the low-melting point powder and the refractory filler powder per unit volume becomes too large, and therefore it is impossible to secure the sufficient fluidity since the flow resistance increases during heating. On the other hand, if $S\times\rho$ is at most 1, the interface area between the low-melting point glass powder and the refractory filler powder becomes small, further the difference in the thermal expansion coefficient is significantly different, whereby a stress is formed due to the difference in the shrinkage in a cooling step after heating and thus leading to interfacial failure, and after the heating, the air tightness will be lowered in such a portion, or the mechanical strength of such a protective film or a rib will be deteriorated.

Further, as the a of a filler powder to be used becomes lower, it is possible to adjust a frit to a desired α by a smaller amount of the filler powder to be used, and it is preferred that α is at most $10\times10^{-7}/°$ C. on the average at a temperature of from 30 to 250° C. Either silica ($\alpha=0.5\times10^{-7}/°$ C.) or cordierite ($\alpha=1\times10^{-7}/°$ C.) is a material having $SiO_2$ as a main component and α of at most $10\times10^{-7}/°$ C., and a bond of (—P—O—Si—) can readily be formed with $P_2O_5$ in a low-melting point glass component, whereby it is possible to obtain a strong bonding state. Further, likewise, the above zirconium phosphate type oxide ($\alpha=-32$ to $8\times10^{-7}/°$ C.) is also a material having α of at most $10\times10^{-7}/°$ C., and it is possible to obtain stronger bonding state by bonding $P_2O_5$ as a main component with each other.

However, in order to obtain the frit of the present invention, it is necessary to strictly control the synthesis conditions of a refractory filler powder so as to maintain the properties of the refractory filler powder as mentioned above. Regarding silica, a crystal body having a purity of at most 95%, such as quartzite or quartz, is once melted in e.g. an electric furnace, and then an ingot is prepared, followed by rough pulverization. Then, such a roughly pulverized product may be finely pulverized optionally by e.g. a ball mill, coarse particles exceeding 150 μm may be removed by e.g. sieving, it necessary, and then fine particles are removed by e.g. a wind power separator so as to adjust the particles to the prescribed particle size and average particle size. With respect to the mechanism of a device for preparing such a powder, various proposals have been made, but in the present invention, such a mechanism may not particularly be limited and should be selected from the industrial or economical viewpoints.

Further, recently, a powder obtained by a preparation method using a water glass or an alkoxide silicate as a raw material, has also been developed. However, a large amount of OH groups remains in the powder obtainable, and such OH groups are liberated during heating to form residual bubbles containing a water vapor, whereby the mechanical strength of a frit is likely to be deteriorated. Accordingly, it is preferred that the powder is preliminary fired at a temperature of at least 800° C. and at most 1,400° C. to sinter the above fine particles while sufficiently removing the OH groups so as to have a fine inert surface. Further, it is also effective to melt the silica powder to be used in the present invention, in a flame by e.g. a spraying burner thereby to round the edge portions of the particles, in order to effectively prevent the flow obstruction.

Further, in the case of cordierite or zirconium phosphate type oxides, a raw material may be prepared so as to have prescribed components, and then mixed while pulverization is conducted if necessary, and then a crystal is synthesized at a prescribed temperature, followed by carrying out the same method as in silica to obtain a powder.

Here, in the case of cordierite, in addition to the above method, there is also a method in which a raw material prepared so as to have prescribed components is melted in an electric furnace to prepare a cullet once, and then heated again so as to crystallize it. There is no large difference in structure of crystals obtained by either method, but the hardness of such a crystal is high, and therefore it is difficult to adjust the particle size to a specific size only by a pulverization method having no separation function such as ball mill. That is, the proportion of formation of small particles becomes higher than the proportion of pulverization of coarse particles, and even if a powder obtainable as a result of removal of coarse particles and fine particles is one pulverized to have a desired average particle size, the amount of a fine powder becomes large in the particle size distribution. Therefore, it is impossible to obtain a refractory filler powder satisfying S×ρ as a requirement of the present invention. Accordingly, it is desired to preliminarily pulverize crystals to be at most 10 mm by e.g. a hummer mill, or preliminarily pulverize cullets to the same level, and then crystallized. Though it is also possible to remove the fine particles by a wind power separator, needless to say, it is more effective to reduce the amount of fine particles from the viewpoint of economy.

Further, in the case of the zirconium phosphate type oxides, if the synthesis temperature is too low, the sintering will be insufficient, and a large amount of cracks will thereby remain on the surface of powder particles, whereby the surface area will be large, but on the other hand, if the temperature is too high, the hardness of the crystal will be increased in the same manner as in cordierite, whereby a large amount of fine particles will remain after the pulverization. Therefore there is a problem that it is impossible to obtain the frit of the present invention in either case. In order to solve the above problem, it is necessary to carry out the synthesis at a temperature of from 1,250 to 1,350° C. for from 2 to 15 hours. Further, in order to further strengthen the bond at the sintering portion, it is possible to add $Fe_2O_3$, $MnO_2$, $CrO_2$ or MgO in an amount within a range of 5% to the total amount of crystals, as an additive to a zirconium phosphate type oxide.

Further, with the low-melting point glass powder, unless the softening pour point range satisfies at least 30° C., the glass will be unstable even when the glass powder is heated at a prescribed temperature of less than the crystallization starting temperature, whereby crystallization starts during softening and flowing, and it is impossible to repeatedly carry out heating in an amorphous state.

Now, the reason for limitation of the components constituting the low-melting point glass of the present invention will be described below.

First of all, the tin phosphate type glass will be described.

SnO is an essential component for lowering the melting point of the glass, and it the content of SnO is less than 20%, the viscosity of the glass will be high, and the sealing temperature will be too high, but if it exceeds 68%, vitrification does not occur. Further, the preferred range is from 40 to 65%.

$SnO_2$ is an essential component for stabilizing the glass, and particularly, $SnO_2$ is an essential component for preventing formation of a non-molten precipitate in a melting step of the glass. By incorporating such $SnO_2$ thereto, it is possible to stably carry out sealing or forming of a protective film in the same manner as in a conventional lead type glass, even after the glass is melted. Especially, when the content is from 2 to 5%, the glass stability will be further improved, whereby it is possible to maintain the amorphous state and carry out firing without impairing the fluidity even when heating is repeated in a softening pour point range. Further, when firing is carried out at a temperature of at least the crystallization temperature, the strength will be high as compared with the amorphous state, and further it is possible to form a crystal of tin pirophosphate having a low thermal expansion coefficient as compared with the case at the time of a non-crystal.

Here, SnO in the low-melting point glass is likely to be oxidized to $SnO_2$ by oxidation of the surface of a refractory filler powder during heating the frit, but by controlling the refractory filler powder to the range defined in the present invention, an excess oxidation reaction will not undergo, and therefore $SnO_2$ never exceeds the above range.

However, if such a content exceeds 5%, crystals containing $SnO_2$ as a main component are likely to be precipitated in a melt, whereby there will be a problem such that no vitrification occurs during the melting or the softening pour range cannot be secured since the tendency for the crystallization of the frit becomes too strong. On the other hand, if it is less than 0.5%, there is a problem that the softening pour range cannot be secured since crystals containing, as a main component, SnO produced at a lower temperature than $SnO_2$ are precipitated therein. Further, the preferred range is from 1 to 5%.

$P_2O_5$ is an essential component for forming a glass network former, and if such a content is less than 20%, no vitrification occurs, and if such a content exceeds 40%, the weather resistance will be deteriorated. The preferred range is from 25 to 40%.

A low-melting point glass containing the above three components is sufficiently suitable for a sealing material for a low temperature since its glass transition point is low, but the following components may be incorporated therein. However, if the total amount of other than the components disclosed in the above Claim 1 exceeds 15%, such glass will be unstable and devitrification occurs at the time of forming a low-melting point glass, and even when no devitrification occurs, the tendency for crystallization of a glass will be too strong, and such glass tends to be crystallized without being softened and flowed during heating, whereby it is likely that such glass cannot be adhered with an object to be adhered.

As additive components, $SiO_2$, ZnO, $Al_2O_3$, $WO_3$, $MoO_3$, $Nb_2O_5$, $TiO_2$, ZrO, CuO and $MnO_2$ may, for example, be incorporated as components for stabilizing the glass.

$SiO_2$ is a component which may be added for forming a glass network former, but if its content exceeds 2%, the softening point of the low-melting point glass powder increases, whereby it is impossible to obtain a frit which is applicable at a temperature of at most 500° C. The content is preferably at most 1%.

ZnO has an effect of lowering a other than the effect of stabilizing the glass, and its content is from 0 to 15%. If the content exceeds 15%, such glass tends to be drastically crystallized, whereby there is a problem that the softening pour range cannot be secured, and therefore the content is preferably from 0 to 6%.

$Al_2O_3$, $WO_3$ and $MoO_3$ also have an effect of lowering a other than the effect of stabilizing the glass, and therefore it is possible to incorporate each component in an amount of from 0 to 10% into the glass. If the content exceeds 10%, the viscosity of the glass will be high and the fluidity will be impaired, and therefore it is impossible to obtain a frit which is applicable at a temperature of at most 500° C. Further, such components are not used alone, but at least one of them is preferably used in combination with ZnO. Further, the content in the glass is preferably at most 7%.

$Nb_2O_5$, $TiO_2$ and $ZrO_2$ also have an effect of improving the chemical durability, and therefore each component may be incorporated into the glass in an amount of from 0 to 10%. If the content exceeds 15%, the glass tends to be drastically crystallized, whereby there will be a problem that the softening pour range cannot be secured, and therefore the content is preferably at most 8%.

CuO and $MnO_2$ also have an effect of improving the chemical durability, and therefore each component may be incorporated into the glass in an amount of from 0 to 10%. If the content exceeds 10%, the softening point will be high and the fluidity will be reduced, and therefore, it is impossible to obtain a frit which is applicable at a temperature of at most 500° C. The content is preferably at most 5%.

Further, the condition that the softening pour point range is at least 30° C., is applicable not only in the above tin phosphate type glass but also in other non-lead glass as mentioned below. Under such a condition, the glass will not be unstable even when heated at the prescribed temperature of less than the crystallization starting temperature, and it is thereby possible to maintain an amorphous state even when repeatedly heated.

On the other hand, there is a problem that $R_2O$ (R is Li, Na or K) and R'O (R' is Ca, Sr or Ba) move to the vicinity of the interface with the refractory filler powder to accelerate crystallization of the glass, and from this site, the glass tends to be crystallized without being softened and flowed, whereby it becomes impossible to bond it with an object to be bonded. Accordingly, the total amount of $R_2O$ and R'O is less than 0.5% based on 100 mass % of the low-melting point glass. It is preferably at most 0.3%.

The low-melting point glass powder to be used in the present invention as mentioned above, has a glass transition point of from 250 to 350° C., and the fluidity thereof is excellent at a temperature of at most 500° C., particularly from 320 to 500° C., but a becomes from 90 to $150 \times 10^{-7}$/° C., and the refractory filler powder is added thereto so that $\alpha$ would be adjusted to be at most $50 \times 10^{-7}$/° C. The blend proportion is such that the proportion of the refractory filler powder is from 35 to 55 vol %, to from 45 to 65 vol % of a low-melting point glass powder. If the mixed amount of the refractory filler powder exceeds 55 vol %, it is difficult to obtain the fluidity as a frit. Further, if it is less than 35 vol %, it is impossible to reduce $\alpha$ to be $50 \times 10^{-7}$/° C.

Further, when a heat absorbent powder is contained in the frit, if the mixed amount of the refractory filler powder exceeds 50 vol %, it will be difficult to obtain the fluidity as the frit. On the other hand, if it is less than 30 vol %, it will be difficult to lower $\alpha$ to $50 \times 10^{-7}$/° C. Further, it the content of the heat absorbent powder exceeds 10 vol %, the fluidity will be lowered. On the other hand, if it is less than 1 vol %, it will be difficult to obtain the heat absorbing effect, and it is difficult to melt the frit more easily by local heating.

Now, the bismuth type glass will be described.

$Bi_2O_3$ is an essential component for lowering the melting point of the glass, and if the content is less than 30%, the effect for sufficiently lowering the softening point of the glass will be low. On the other hand, if it exceeds 50%, no vitrification occurs and the thermal expansion coefficient increases, and not only that, the glass tends to be crystallized, whereby it is impossible to adjust the softening pour point range of the low-melting point glass to be at least 30° C. The content is preferably from 35 to 48%, more preferably from 38 to 45%.

$B_2O_3$ is an essential component for forming a glass network former, and if its content is less than 15%, vitrification will be difficult or the glass tends to be crystallized, whereby it is impossible to adjust the softening pour point range of the low-melting point glass to be at least 30° C. On the other hand, if it exceeds 25%, the softening point tends to be too high. The content is preferably from 17 to 24%, more preferably from 18 to 23%.

ZnO is an essential component for lowering the thermal expansion coefficient and further lowering the softening temperature, and if its content is less than 25%, vitrification will be difficult. On the other hand, if it exceeds 35%, devitrification tends to occur at the time of forming the low-melting point glass, whereby it is impossible to obtain the glass, or the glass tends to be crystallized, whereby it will be difficult to adjust the softening pour point range of the low-melting point glass to be at least 30° C. The content is preferably from 27 to 35%, more preferably from 29 to 34%.

The glass formed from the above-mentioned three components has a low glass transition point, and thus is suitable for a low-melting point glass, but an optional component such as $Al_2O_3$, $CeO_2$, $SiO_2$, $Ag_2O$, $WO_3$, $MoO_3$, $Nb_2O_3$, $Ta_2O_5$, $Ga_2O_3$, $Sb_2O_3$, $Cs_2O$, CaO, SrO, BaO, $P_2O_5$ or $SnO_x$ (x is 1 or 2) may be incorporated therein. However, if the content of the optional component is too large, the glass will be unstable and devitritication will occur, or the glass transition point or the softening point is likely to be high, and therefore the total content of the optional component is preferably at most 10 mass %. The lower limit of the total content of the optional component is not particularly limited.

Then, such a sealing material is formed into a paste by using e.g. an organic type vehicle, so as to be easily applied on an object to be sealed. As the organic type vehicle to be used, for example, one having e.g. nitrocellulose dissolved in a solvent such as butyl carbitol acetate or propylene glycol diacetate, or one having an acrylic resin such as methyl (meth)acrylate, ethyl (meth)acrylate, butyl (meth)acrylate or 2-hydroxyethyl methacrylate dissolved in a solvent such as methyl ethyl ketone, butyl carbitol acetate or ethyl carbitol acetate, may be mentioned, but it is not particularly limited so long as it is a material which has a desired rheology characteristics and further which can be vaporized or decomposed and removed at a temperature of at most the sealing temperature.

As mentioned above, the frit of the present invention has $\alpha$ of at most $50 \times 10^{-7}$/° C., and is applicable to an operation such as sealing or Wintering at a temperature of at most 500° C. Especially, it is possible to use the frit for kovar to be used for an electronic component such as a quartz package, an alkali-free glass to be used for a liquid crystal display or a flat panel display such as OLED, or for adhesion or protection of a silicon substrate for solar power generation.

The frit of the present invention is a frit containing substantially no lead, which is used for a material having $\alpha$ of at most $50 \times 10^{-7}$/° C. and processable in e.g. sealing or Wintering at 500° C. or lower, wherein the frit contains a low-melting point glass powder in an amount of from 35 to 65 vol % containing, by "mol %" as calculated as oxides, from 20 to 68% of SnO, from 0.5 to 5% of $SnO_2$, from 20 to 40% of $P_2O_5$, and further less than 0.5% in total of $R_2O$ and R'O, and containing from 35 to 65 vol % of at least one refractory filler powder selected from the group consisting of silica, cordierite and zirconium phosphate type oxides (zirconium phosphate, zirconium tungstate phosphate, zirconium niobate phosphate, zirconium tantalate phosphate and a composite oxide as a combination thereof), wherein the refractory filler powder to be used satisfies the relationship of $1<S\times\rho 10$ (wherein S: specific surface area ($m^2/g$) and $\rho$: density ($g/cm^3$)), and satisfies the softening pour point range of the low-melting point glass powder of at least 30° C.

Further, the raw materials were mixed so as to have the above composition range (wherein the same raw material for SnO was used for the raw material for $SnO_2$) to prepare a batch raw material, and such a batch raw material was put in a quartz crucible, the crucible was put in a furnace adjusted to from 1,000 to 1,200° C. and heated for from 10 to 90 minutes for oxidation treatment, and then, a lid was mounted on the quartz crucible, followed by melting for from 30 to 90 minutes. Then, such molten glass was formed into a sheet by a water-cooled roller, followed by pulverization to obtain a powder, which was then passed through a sieve having an opening of 75 μm to obtain a low-melting point glass powder.

From 35 to 65 vol % of a refractory filler powder satisfying the requirement of the present invention is added to from 35 to 65 vol % of such a low-melting point glass powder to prepare a frit. Then, such a frit is formed into a paste by e.g. an organic type vehicle and then applied on an object to be adhered. The coating method may, for example, be screen printing, metal mask printing or dispenser, but such a method may be selected depending upon the material to which the frit is applied. Further, the frit may preliminarily be formed into a tablet or a sheet, so as to conform to the shape of the portion to be adhered. At that time, when a binder component is added thereto as well as the paste, it is possible to obtain a molded product which will hardly be deformed after the molding. Further, as an atmosphere during heating, the atmospheric air may be employed, but in order to prevent oxidation of SnO contained in the frit, it is possible to introduce an inert gas such as argon, nitrogen or helium, alone or as a mixture, into a heating device.

Now, Examples and Comparative Examples of the present invention will be described in detail with reference to Tables 1 to 3.

TABLE 1

| | Ex. 1 | Ex. 2 | Ex. 3 | Ex. 4 | Ex. 5 | Ex. 6 |
|---|---|---|---|---|---|---|
| SnO (mol %) | 55.7 | 59.3 | 63.3 | | 68.4 | |
| $SnO_2$ | 3.1 | 0.8 | 2.5 | | 2.1 | |
| $P_2O_5$ | 32.5 | 33.3 | 28.8 | | 29.5 | |
| ZnO | 4.8 | 6.0 | 4.9 | | | |
| $Al_2O_3$ | 2.3 | 0.5 | | | | |
| $SiO_2$ | 1.6 | 0.6 | | | | |
| RO + R'$_2$O (mass %) | 0.12 | 0.09 | 0.17 | | 0.28 | |
| Softening point (° C.) | 406 | 367 | 366 | | 351 | |
| Crystallization starting temperature (° C.) | 461 | 413 | 433 | | 421 | |
| Softening pour point range (° C.) (Crystallization starting temperature) – (Softening point) | 55 | 46 | 67 | | 70 | |
| Vitrified state | Transparent Zirconium phosphate | Transparent Cordierite | Transparent Zirconium tungstate phosphate | Transparent Silica | Silica | Zirconium phosphate |
| Specific surface area: S ($m^2/g$) | 0.65 | 0.61 | 1.45 | 4.00 | 4.00 | 0.65 |
| Specific gravity: $\rho$ ($g/cm^3$) | 3.8 | 2.6 | 3.9 | 2.2 | 2.2 | 3.8 |
| S × $\rho$ ($m^2/cm^3$) | 2.5 | 1.6 | 5.7 | 8.8 | 8.8 | 2.5 |
| Low-melting point glass powder (vol %) | 56 | 55 | 54 | 62 | 49 | 52 |
| Refractory filler powder (vol %) | 44 | 45 | 46 | 38 | 51 | 48 |
| $\alpha$ (×$10^{-7}$/° C.) | 44 | 46 | 37 | 49 | 43 | 40 |
| Vehicle construction | Nitro-cellulose 3% Butylcarbitol acetate 87% | | | Nitrocellulose 4% Butylcarbitol acetate 50% Propylene glycol diacetate 46% | | |
| Adhesion temperature (° C.) | 451 | 403 | 423 | 483 | 411 | 411 |
| Adhesion state | ○ | ○ | ○ | ○ | ○ | ○ |
| Scratch test | ○ | ○ | ○ | ○ | ○ | ○ |
| Fired film | Glossy | Glossy | Glossy | Not glossy | Glossy | Glossy |

EXAMPLE 1

First of all, a raw material was prepared so as to have the composition shown in Table 1 after being molten. Then, such a raw material was charged into a crucible, which was then put in a furnace having a temperature adjusted to from 1,000 to 1,200° C. in an air atmosphere so that the batch was subjected to oxidation treatment, and then a lid was mounted on the crucible, whereupon the raw material was melted for 60 minutes including the time for the oxidation treatment. The melt was transparent, and an unmelted product such as a crystal was not observed. The melt was formed into a sheet by a water cooling roller, and passed through a sieve having an opening of 75 μm to obtain a low-melting point glass having a softening point of 406° C. and a crystallization starting temperature of 461° C. At that time, the total amount of $R_2O$ and R'O was 0.12% when the mass of the low-melting point glass was 100 mass %. Here, the total amount of $R_2O$ and R'O was calculated from the values obtained in such a manner that the low-melting point glass powder was dissolved in an acid, and measurement was carried out at an accuracy of a determination lower limit of 0.01% for each element, by using an atomic absorption analysis device.

Then, a method of preparing zirconium phosphate as a refractory filler powder is shown below. Raw materials were weighed and blended so as to have a composition of $(ZrO)_2P_2O_7$, then, as an aid, two parts by mass of MgO based on 100 parts by mass in total of the raw materials was added thereto, followed by adding water thereto so that such solid raw materials would be 30 mass %, and a slurry thus obtained was mixed by using a ball mill. Then, the slurry thus obtained was dried in a spray dryer to obtain oblate granules dimpled at their centers. Such granules were packed in an alumina container, followed by firing at 1,250° C. for 8 hours. Obtained crystals were crushed and passed through a sieve having an opening of 45 μm to obtain a zirconium phosphate powder having a specific surface area: $S=0.65$ m$^2$/g, a specific gravity; $\rho=3.8$ g/cm$^3$ and $S\times\rho=2.5$ m$^2$/cm$^3$. Here, the specific surface area was measured by nitrogen gas absorption method, and the specific gravity was measured by using a picnometer in accordance with Archimedes principle.

56 vol % of the low-melting point glass powder and 44 vol % of the zirconium phosphate powder obtained as mentioned above were mixed with each other to obtain a frit having α of $44\times10^{-7}$/° C. Here, α was measured in such a manner that the frit was packed in an alumina-made container, then fired for 10 minutes at a temperature lower by 5° C. than the crystallization starting temperature of the low-melting point glass powder, followed by annealing, and then polished into a column having a length of 15 mm and a diameter of 5 mm, followed by measuring elongation under a condition at a temperature raising rate of 10° C./min by means of compression method (a thermomechanical analysis 8310, Rigaku Corporation) to calculate an average heat expansion coefficient at a temperature of from 30 to 200° C.

Then, a paste was prepared by using such a frit. The preparation of the paste was carried out by mixing a vehicle with the frit as mentioned below.

Vehicle: 3 mass % of nitrocellulose as a resin, and 87 mass % of butyl carbitol acetate and 10 mass % of dibutyl phthalate as solvents were stirred for 2 hours under heating at 60° C. to prepare a vehicle.

Paste: 85 mass % of the frit and 15 mass % of the vehicle were kneaded by a planetary mixer. Then, the is vehicle was added so that the viscosity would be from 40 to 60 Pa·s, whereby a paste for evaluation was prepared. Further, a B type viscometer (HDBVII+, manufactured by Brookfield Engineering) was used for the viscosity measurement.

The adhesion of the frit was evaluated as follows. First of all, the paste obtained as described above was subjected to screen printing so that a square pattern with a width of 2 mm and with one side having a length of 45 mm would be formed on a glass substrate (AN100, thickness: 0.7 mm, length: 50 mm, width: 50 mm, manufactured by Asahi Glass Company, Limited). The printed substrate was dried at 120° C. and heated at a temperature higher by 10° C. than the softening point to remove an organic component and to bake the frit. On such a substrate, a glass substrate using the same material and having a pore with a diameter of 1 mm for depression in its center was laminated and fired at a temperature lower by 10° C. than the crystallization starting temperature while a load of 2 kg was exerted thereon so as to adhere the glass substrates with each other, followed by observing the adhesion state by using an optical microscope capable of polarization. As the evaluation method, ○ represents a case where no residual bubbles having at least 1 mm due to flow deficiency and no interference fringe formed by delamination are observed, Δ represents a case where either the interference fringe or the residual bubbles are visually observed though such glass substrates were adhered with each other, and X represents a case where such glass substrates were not adhered with each other. In the case of the frit in Example 1, no peeling, interference fringes or remaining bubbles were observed, and therefore it was possible to obtain a preferred adherend.

Further, as characteristics of a protective film or a rib, "good" (○) represents a case where no damages or delamination was observed, Δ represents a case where damages were observed but no delamination was observed, and "poor" (X) represents a case where damages and delamination were observed, when the above baked frit was subjected to a scratch test (JIS K5600 5-4) by using a 2H pencil. The film fired under the same conditions as in the evaluation of the sealing property was glossy in appearance, and no damage and delamination were observed even after the scratch test.

EXAMPLE 2

A raw material was prepared so as to have the composition shown in Table 1 after being molten, and a low-melting point glass was obtained in the same manner as in Example 1, Further, the softening point was 367° C., the crystallization starting temperature was 413° C., and the total amount of $R_2O$ and R'O was 0.09 mass %.

Then, a raw material was weighed so as to have a composition of $2MgO.2Al_2O_3.5SiO_2$ and melted at 1,500° C. to obtain a glass fabric, and such a glass fabric was subjected to water granulation in water to obtain cullets having a maximum diameter of 3 mm. Such cullets were fired at 1,350° C., for 5 hours, then crushed by a ball mill, and passed through a sieve having an opening of 45 μm to obtain a cordierite powder having a specific surface area: $S=0.61$ m$^2$/g, a specific gravity: $\rho=2.6$ g/cm$^3$ and $S\times\rho=1.6$ m$^2$/cm$^3$.

55 vol % of the low-melting point glass powder and 45 vol % of the cordierite powder obtained as described above, were mixed with each other to obtain a frit having α of $46\times10^{-7}$/° C. Such a frit was formed into a paste in the same manner as in Example 1 to confirm the sealing property, and as a result, interference fringes formed by delamination due to the remaining stress and remaining bubbles due to the flow deficiency were not observed. Further, the film fired under the same conditions as in the evaluation of sealing property was glossy in appearance, and no damage and delamination were observed even in the scratch test.

EXAMPLE 3

A raw material was prepared so as to have the composition shown in Table 1 after being molten, and a low-melting point glass was obtained in the same manner as in Example 1. Further, the softening point was 366° C., the crystallization starting temperature was 433° C., and the total amount of $R_2O$ and R'O was 0.17 mass %.

Then, raw materials were weighed and blended so as to have a composition of $Zr_2(WO_4)(PO_4)_2$, then, as an aid, two parts by mass of MgO based on 100 parts by mass in total of the raw materials was added thereto, followed by adding water thereto so that such solid raw materials would be 30 mass %, and a slurry thus obtained was mixed by using a ball mill. Then, the slurry thus obtained was put in a bat and dried, then passed through a sieve having an opening of 500 μm, and then packed in an alumina container and fired at 1,250° C. for 8 hours. Obtained crystals were crushed by a ball mill, and further finely pulverized by a jet mill to obtain a zirconium tungstate phosphate powder having a specific surface area of $S=1.45$ m$^2$/g, a specific gravity of $\rho=3.9$ g/cm$^3$ and $S\times\rho=5.7$ m$^2$/cm$^3$.

54 vol % of the low-melting point glass powder and 46 vol % of the zirconium tungstate phosphate powder thus obtained were mixed with each other to obtain a frit having α of $37\times10^{-7}$/° C. A paste was prepared in the same manner as in Example 1 except that such a frit was stirred for 2 hours under heating at 60° C. with 4% of nitrocellulose as a resin and 50% of butyl carbitol acetate and 46% of propylene glycol diacetate as solvents to prepare a vehicle, and the sealing property was confirmed, and as a result, no interference fringes formed by delamination due to the remaining stress and no remaining bubbles due to flow deficiency were observed. Further, the fired film obtained by firing under the same conditions as in the evaluation of the bonding property was glossy in appearance and no damage and delamination were observed even in a scratch test.

EXAMPLE 4

62 vol % of the low-melting point glass powder obtained in Example 3 and 38 vol % of a zirconium tungstate phosphate powder were mixed with each other to obtain a frit having α of $49\times10^{-7}$/° C.

Such a frit was formed into a paste in the same manner as in Example 3, and the adhesion and the firing of a fired film were carried out at 483° C. which is higher by 50° C. than the crystallization starting temperature to confirm the sealing property, whereupon no interference fringes formed by delamination due to the remaining stress and no remaining bubbles due to flow deficiency were observed. Further, though the firing film was not glossy in appearance but crystallized, no damage and delamination were observed even in a scratch test.

EXAMPLE 5

A raw material was prepared so as to have a composition shown in Table 1 after being molten, and a low-melting point glass was obtained in the same manner as in Example 1. Further, the softening point was 351° C., the crystallization starting temperature was 421° C., and the total amount of $R_2O$ and R'O was 0.28 mass %.

Then, silica was pulverized by a ball mill, and is passed through a sieve having an opening of 45 μm to obtain a silica powder having a specific surface area of S=4.00 m$^2$/g, a specific gravity of $\rho=2.2$ g/cm$^3$ and $S\times\rho=8.8$ m$^2$/cm$^3$.

49 vol % of the low-melting point glass powder and 51 vol % of the silica powder obtained as mentioned above were mixed with each other to obtain a frit having α of $43\times10^{-7}$/° C. Such a frit was formed into a paste in the same manner as in Example 3 to confirm the sealing property, whereupon no interference fringes formed by delamination due to the remaining stress and no remaining bubbles due to the flow deficiency were observed. Further, the fired film obtained by firing under the same conditions as in the evaluation of sealing property was glossy in appearance, and no damage and delamination were observed even in the scratch test.

EXAMPLE 6

52 vol % of the low-melting point glass powder prepared in Example 5, 40 vol % of the zirconium phosphate prepared in Example 1 and 8 vol % of the silica powder prepared in Example 5 were mixed to obtain a frit having a thermal expansion coefficient of $40\times10^{-7}$/° C.

Such a frit was formed into a paste in the same manner as in Example 3 to confirm the sealing property, whereupon no interference fringes formed by delamination due to the remaining stress and no remaining bubbles due to the flow deficiency were observed. The film fired under the same conditions as in the evaluation of the adhesion property was glossy in appearance, and no damage and delamination were observed even in the scratch test.

TABLE 2

|  | Ex. 7 | Ex. 8 |
|---|---|---|
| $Bi_2O_3$ (mol %) | 44.8 | 40.9 |
| $B_2O_3$ | 20.2 | 22.2 |
| ZnO | 33.1 | 30.2 |
| BaO |  | 0.5 |
| CeO | 0.3 |  |
| $Al_2O_3$ | 1.1 | 2.3 |
| $Fe_2O_3$ | 0.5 |  |
| $SiO_2$ |  | 3.9 |
| RO + R'$_2$O (mass %) | 0.08 | 0.12 |
| Softening point (° C.) | 419 | 439 |
| Crystallization starting temperature (° C.) | 462 | 484 |
| Softening pour point Range (° C.) (Crystallization starting temperature) − (Softening point) (° C.) | 43 | 45 |
| Vitrified state | Transparent Cordierite | Transparent Zirconium phosphate |
| Specific surface area: S (m$^2$/g) | 0.61 | 0.65 |
| Specific gravity: ρ (g/cm$^3$) | 2.6 | 3.8 |
| S × ρ (m$^2$/cm$^3$) | 1.6 | 2.5 |
| Low-melting point glass powder (vol %) | 56 | 56 |
| Refractory filler powder (vol %) | 44 | 44 |
| α (×10$^{-7}$/° C.) | 43 | 44 |
| Vehicle construction | Nitrocellulose 3% Butylcarbitol acetate 87% Dibutyl phthalate 10% | Nitrocellulose 4% Butylcarbitol acetate 50% Propylene Glycol Acetate 46% |
| Adhesion temperature (° C.) | 452 | 474 |
| Adhesion state | ◯ | ◯ |
| Scratch test | ◯ | ◯ |
| Fired film | Glossy | Glossy |

Then, in Examples 7 and 8, a low-melting point glass containing from 30 to 50% of $Bi_2O_3$, from 15 to 25% of $B_2O_3$ and from 25 to 35% of ZnO will be described as an example.

EXAMPLE 7

First of all, a raw material was prepared so as to have a composition shown in Table 2 after being molten. Then such a raw material was put in a crucible and melted for 60 minutes, in a furnace adjusted to from 1,100 to 1,300° C. in an atmosphere. Such a melt was transparent, but no unmelted product such as a crystal was observed. Such a melt was formed into a sheet by a water-cooling roller, and passed through a sieve having an opening of 45 μm to obtain a low-melting point glass having a softening point of 419° C. and a crystallization starting temperature of 462° C. At that time, the total amount of $R_2O$ and R'O was 0.08 mass % when the mass of the low-melting point glass powder was 100 mass %.

Then, 54 vol % of the low-melting point glass powder thus prepared and 46 vol % of the cordierite powder prepared in Example 2 were mixed with each other to obtain a frit having α of $43 \times 10^{-7}/°$ C. Such a frit was formed into a paste in the same manner as in Example 1 to confirm the sealing property, whereupon no interference fringes formed by delamination due to the remaining stress and no remaining bubbles due to the flow deficiency were observed. Further, the fired film obtained by firing under the same conditions as in the evaluation of sealing property was glossy in appearance, and no damage and delamination were observed even in the scratch test.

EXAMPLE 8

A raw material was prepared so as to have a composition shown in Table 2 after being molten, and a low-melting point glass was obtained in the same manner as in Example 7. Further, the softening point was 439° C., the crystallization starting temperature was 484° C., and the amount of $R_2O$ and R'O was 0.12 mass %.

Then, 56 vol % of the low-melting point glass powder thus prepared and 44 vol % of the cordierite powder prepared in Example 2 were mixed to obtain a frit having α of $45 \times 10^{-7}/°$ C. Such a frit was formed into a paste in the same manner as in Example 3 to confirm the sealing property, whereupon no interference fringes formed by delamination due to the remaining stress and no remaining bubbles due to the flow deficiency were observed. Further, a fired film obtained by firing under the same conditions as in the evaluation of sealing property was glossy in appearance, and no damage and delamination were observed even in the scratch test.

TABLE 3

| | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| SnO (mol %) | 59.4 | 62.0 | 61.3 | 59.7 | 55.4 | 68.9 |
| $SnO_2$ | 2.8 | 2.6 | 1.7 | 0.4 | 5.2 | 1.1 |
| $P_2O_5$ | 30.7 | 31.0 | 31.0 | 33.3 | 33.0 | 29.6 |
| ZnO | 4.9 | 2.4 | 5.5 | 6.0 | 6.0 | |
| $Al_2O_3$ | 1.4 | 1.2 | 0.5 | | | |
| $SiO_2$ | 0.8 | 0.8 | | 0.6 | 0.4 | 0.4 |
| RO + R'$_2$O (mass %) | 0.09 | 0.14 | 0.58 | 0.04 | 0.07 | 0.09 |
| Softening point (° C.) | 385 | 372 | 367 | 359 | | |
| Crystallization starting temperature (° C.) | 446 | 423 | 394 | 382 | | |
| Softening pour point temperature (Crystallization starting temperature) − (Softening point) (° C.) | 61 | 51 | 27 | 23 | | |
| Vitrified state | Transparent | Transparent | Transparent | Transparent | Not Vitrified | Not vitrified |
| | Zirconium phosphate | Silica | Zirconium phosphate | Cordierite | — | — |
| Specific surface area: S ($m^2/g$) | 2.85 | 0.37 | 0.65 | 0.61 | — | — |
| Specific gravity: ρ ($g/cm^3$) | 3.8 | 2.2 | 3.8 | 2.6 | — | — |
| S × ρ ($m^2/cm^3$) | 10.8 | 0.8 | 2.5 | 1.6 | — | — |
| Low-melting point glass powder (vol %) | 57 | 55 | 56 | 55 | — | — |
| Refractory filler powder (vol %) | 43 | 45 | 44 | 45 | — | — |
| α ($\times 10^{-7}/°$ C.) | 46 | 46 | 45 | 45 | — | — |
| Vehicle construction | | Nitrocellulose 3% Butylcarbitol acetate 87% Dibutyl phthalate 10% | | | — | — |
| Adhesion temperature (° C.) | 436 | 413 | 384 | 372 | | |
| Adhesion state | X | X | X | X | — | — |
| Scratch test | Δ | Δ | X | X | — | — |
| Fired film | Not glossy | Glossy (crack) | Not glossy | Not glossy | — | — |

COMPARATIVE EXAMPLE 1

Comparative Example 1 is an Example in which S×ρ becomes at least 10. A raw material was prepared so as to have a composition shown in Table 3 after being molten, and a low-melting point glass was obtained in the same manner as in Example 1. Further, the softening point was 385° C., the crystallization starting temperature was 446° C., and the total amount of $R_2O$ and R'O was 0.09 mass %.

Then, zirconium phosphate prepared in Example 1 was further pulverized by an Attritor to obtain a zirconium phosphate powder having a specific surface area of S=2.85 m²/g, a specific gravity of ρ=3.8 g/cm³ and S×ρ=10.8 m²/cm³.

57 vol % of the low-melting point glass powder and 43 vol % of the zirconium phosphate powder obtained as the above were mixed to obtain a frit having α of 46×10⁻⁷/° C. Such a frit was formed into a paste in the same manner as in Example 3 to confirm the sealing property, whereupon the frit was not flowed and a glass substrate was not adhered. Further, a fired film was not glossy in appearance, and damages were observed in a scratch test.

COMPARATIVE EXAMPLE 2

Comparative Example 2 is an Example in which S×ρ becomes at most 1. A raw material was prepared so as to have a composition shown in Table 3 after being molten, and a low-melting point glass was obtained in the same manner as in Example 1. Further, the softening point was 372° C., the crystallization starting temperature was 423° C., and the total amount of $R_2O$ and R'O was 0.14 mass %.

Then, silica was pulverized for a period shorter than Example 5, and then passed through a sieve having an opening of 45 μm to obtain a silica powder having a specific surface area of S=0.37 m²/g, a specific gravity of ρ=2.2 g/cm³ and S×ρ=0.8 m²/cm³.

55 vol % of the low-melting point glass powder and 45 vol % of the silica powder obtained as the above were mixed to obtain a frit having α of 46×10⁻⁷/° C. Such a frit was formed into a paste in the same manner as in Example 3 to confirm the sealing property, whereupon the frit flowed well, but a large amount of fine cracks were observed on the interface between the filler and the glass, and delamination was partly confirmed. Further, the fired film was glossy in appearance, but damages were formed in a scratch test.

COMPARATIVE EXAMPLE 3

Comparative Example 3 is a case where a softening pour point range of the low-melting point glass powder was less than 30° C., and the total amount of $R_2O$ and R'O exceeds 0.5 mass %. A raw material was prepared so as to have a composition shown in Table 3 after being molten, and a low-melting point glass was obtained in the same manner as in Example 1. Further, the softening point was 367° C., the crystallization starting temperature was 394° C., and the total amount of $R_2O$ and R'O was 0.58 mass %.

Then, by using the same zirconium phosphate as the one prepared in Example 1, 56 vol % of a low-melting point glass powder and 44 vol % of a zirconium phosphate powder were mixed to obtain a frit having α of 45×10⁻⁷/° C. Such a frit was formed into a paste in the same manner as in Example 3 to confirm the sealing property, but the frit was crystallized and thus was not flowed, and therefore it was impossible to adhere the glass substrate. Further, the fired film was delaminated in a scratch test since the frit was not sintered.

COMPARATIVE EXAMPLE 4

Comparative Example 4 is a case where the softening pour point range of the low-melting point glass powder is less than 30° C., and further $SnO_2$ in the low-melting point glass is less than 0.5%. A raw material was prepared so as to have the composition shown in Table 3 after being molten, and a low-melting point glass was obtained in the same manner as in Example 1. Further, the softening point was 359° C., the crystallization starting temperature was 382° C., and the total amount of $R_2O$ and R'O was 0.04 mass %.

Then, by using the same cordierite as the one prepared in Example 2, 55 vol % of a low-melting point glass powder and 45 vol % of a cordierite powder were mixed to obtain a frit having α of 45×10⁻⁷/° C. Such a frit was formed into a paste in the same manner as in Example 3 to confirm the sealing property, but the frit was crystallized and thus was not flowed, and therefore it was impossible to adhere the glass substrate. Further, the fired film was delaminated in a scratch test since the frit was not sintered.

COMPARATIVE EXAMPLES 5 to 6

Comparative Example 5 is a case where $SnO_2$ in a low-melting point glass exceeds 5%, and Comparative Example 6 is a case where SnO exceeds 68%, but in either Example, it was impossible to obtain a uniform glass due to production of crystals after being molten.

Then, Examples 9 and 10 show Examples in which substrates are adhered to each other by means of laser heating.

EXAMPLE 9

The paste prepared in Example 2 was printed on a glass substrate by screen printing in the same manner as in Example 1, whereby a frit was baked thereon. Such a substrate was laminated on a glass substrate using the same material and having a pore with a diameter of 1 mm for depressure in its center so as to sandwich a frit fired film therebetween, a laser beam (semiconductor laser) having a wavelength of 808 nm and an output power of 8 W was applied thereon at a scan rate of 5 mm/s while a load of 2 kg was exerted thereon, and then a sealing material layer was melted and solidified by quenching, whereby such a layer was adhered thereon. The portion irradiated with laser at that time was measured by a radiation thermometer, and such a temperature was 455° C. The sealing property was confirmed, whereupon no interference ranges formed by delamination due to the remaining stress and no remaining bubbles due to the flow deficiency were observed. Further, the fired film obtained by firing under the same conditions as in the evaluation for sealing property was glossy in appearance, and no damage or delamination was observed even in a scratch test.

EXAMPLE 10

The paste prepared in Example 7 was printed on a glass substrate by screen printing in the same manner as in Example 1, whereby a frit was baked thereon. Such a substrate was laminated on a glass substrate using the same material and having a pore with a diameter of 1 mm for depressure in its center, so as to sandwich a frit fired film therebetween, then a laser beam (semiconductor laser) having a wavelength of 808 nm and an output power of 12 W was applied thereon at a scan rate of 3 mm/s while a load of 2 kg was exerted thereon, and then a sealing material layer was melted and solidified by quenching, whereby such a layer was adhered thereon. The portion irradiated with laser at that time was measured by a radiation thermometer, and such a temperature was 485° C. The sealing property was confirmed, whereupon no interference ranges formed by delamination due to the remaining stress and no remaining bubbles due to the flow deficiency were observed. Further, the fired film obtained by firing under the same conditions as in the evaluation for the sealing property was glossy in appearance, and no damage or delamination was observed even in a scratch test.

As mentioned above, according to the frit of the present invention, it is possible to obtain the same sealing property as in the firing furnace also by the laser heating.

TABLE 4

|  | | Ex. 9 | Ex. 10 |
|---|---|---|---|
| SnO (mol %) | | 59.3 | |
| $SnO_2$ | | 0.8 | |
| $P_2O_5$ | | 33.3 | |
| ZnO | | 6.0 | 33.1 |
| $Al_2O_3$ | | | 1.1 |
| $SiO_2$ | | 0.6 | |
| $Fe_2O_3$ | | | 0.5 |
| $Bi_2O_3$ | | | 44.8 |
| $B_2O_3$ | | | 20.2 |
| $CeO_2$ | | | 0.3 |
| RO + R'$_2$O (mass %) | | 0.09 | 0.08 |
| Softening point (° C.) | | 367 | 419 |
| Crystallization starting temperature (° C.) | | 413 | 462 |
| (Crystallization starting temperature) − (Softening point) (° C.) | | 46 | 43 |
| Vitrified state | | Transparent Cordierite | Transparent Cordierite |
| Specific surface area: S ($m^2/g$) | | 0.61 | 0.61 |
| Specific gravity: ρ ($g/cm^3$) | | 2.6 | 2.6 |
| S × ρ ($m^2/cm^3$) | | 1.6 | 1.6 |
| Low-melting point glass powder (vol %) | | 55 | 56 |
| Refractory filler powder (vol %) | | 45 | 44 |
| α ($\times 10^{-7}$/° C.) | | 46 | 43 |
| Vehicle construction | | Nitrocellulose 3% Butylcarbitol acetate 87% Dibutyl phthalate 10% | Nitrocellulose 3% Butylcarbitol acetate 87% Dibutyl phthalate 10% |
| Laser beam | Wavelength (nm) | 808 | 808 |
| | Output power (W) | 8 | 12 |
| | Scan rate (mm/s) | 5 | 10 |
| Adhesion temperature (° C.) | | 455 | 485 |
| Adhesion state | | ○ | ○ |

Further, in the above Examples, a low-melting point glass containing from 20 to 68% of SnO, from 0.5 to 5% of $SnO_2$ and from 20 to 40% of $P_2O_5$, and a low-melting point glass containing from 30 to 50% of $Bi_2O_3$, from 15 to 25% of $B_2O_3$ and from 25 to 35% of ZnO were exemplified, but in addition to such a low-melting point glass, a low-melting point glass containing from 30 to 60% of $V_2O_5$, from 20 to 40% of $P_2O_5$ and from 0 to 20% of ZnO, a low-melting point glass containing from 15 to 85% of $Ag_2O$+AgI, from 20 to 45% of $P_2O_5$ and from 0 to 20% of ZnO, and further a low-melting point glass containing from 5 to 15% of $Ag_2O$, from 5 to 20% of $V_2O_5$, from 30 to 50% of $TeO_2$, from 25 to 40% of MoO and from 0 to 20% of ZnO, also have a thermal expansion coefficient of at most $50\times10^{-7}$/° C., and therefore it is possible to obtain a frit having and processable at a temperature of at most 500° C.

INDUSTRIAL APPLICABILITY

The frit of the present invention is useful for a kovar to be used for an electronic component such as a quartz package, an alkali free glass or a reinforced glass to be used for a flat panel display such as a liquid crystal display or an organic EL display, or for sealing, for protective film or for rib formation of a silicon to be used for MEMS or solar power generation.

The entire disclosures of Japanese Patent Application No. 2008-087962 filed on Mar. 28, 2008 and Japanese Patent Application No. 2009-021565 filed on Feb. 2, 2009 including specifications, claims and summaries are incorporated herein by reference in their entireties.

What is claimed is:

1. A frit comprising a low-melting point glass powder, a refractory filler powder and a heat absorbent powder, wherein the frit comprises substantially no lead and has a thermal expansion coefficient of at most $50\times10^{-7}$/° C., and is processable at 500° C. or lower, wherein the low-melting point glass powder has a softening pour point of at least 30° C., and the refractory filler powder satisfies the following relationship:

1<S×ρ<10, wherein

S is a specific surface area ($m^2/g$), and

ρ is density ($g/cm^3$), wherein the frit comprises from 45 to 65 vol % of the low-melting point glass powder, from 30 to 50 vol % of the refractory filler powder, and from 1 to 10 vol % of the heat absorbent powder.

2. The frit according to claim 1, wherein the low-melting point glass powder is made of a low-melting point glass comprising, by "mol %" as calculated as oxides, from 20 to 68% of SnO, from 0.5 to 5% of $SnO_2$ and from 20 to 40% of $P_2O_5$, or a low-melting point glass comprising from 30 to 50% of $Bi_2O_3$, from 15 to 25% of $B_2O_3$ and from 25 to 35% of ZnO.

3. The frit according to claim 1, wherein the refractory filler powder is at least one member selected from the group consisting of silica, cordierite and a zirconium phosphate type oxide.

4. The frit according to claim 1, wherein the heat absorbent powder is made of at least one metal selected from the group consisting of Fe, Cr, Mn, Co, Ni and Cu or a compound comprising the at least one metal.

5. A paste comprising the frit as defined in claim 1 and a vehicle mixed therewith.

6. The frit according to claim 3, wherein the zirconia phosphate type oxide is at least one oxide selected from the group consisting of zirconium phosphate, zirconium tungstate phosphate, zirconium niobate phosphate, and zirconium tantalate phosphate.

* * * * *